United States Patent [19]
Keck

[11] 3,960,402
[45] June 1, 1976

[54] VEHICLE FLOW DIRECTION VANES

[76] Inventor: Jack L. Keck, 9665 Oakmount, Cypress, Calif. 90630

[22] Filed: Sept. 30, 1974

[21] Appl. No.: 510,443

[52] U.S. Cl. .................................. 296/1 S; 105/2 A
[51] Int. Cl.² .......................................... B62C 1/00
[58] Field of Search .......... 296/1 S, 91, 95 R, 137 J; 105/2 A, 2 R

[56] References Cited
UNITED STATES PATENTS

| | | | |
|---|---|---|---|
| 1,871,396 | 8/1932 | Stalker | 296/1 S |
| 2,569,983 | 12/1945 | Favre | 105/2 A |
| 2,933,344 | 4/1960 | Shumaker | 296/1 S |
| 3,010,754 | 11/1961 | Shumaker | 296/1 S |

*Primary Examiner*—L. J. Paperner
*Assistant Examiner*—Kenneth Noland
*Attorney, Agent, or Firm*—Robert O. Richardson

[57] ABSTRACT

Vehicle Flow Direction Vanes for reducing the rear vacuum induced drag on moving vehicles and thus increase mileage performance on the order of 20 percent. Aft, and forward, mounted flow direction vanes are attached to flat-back vehicles to deflect air flow into the drag producing reduced pressure area rearwardly of the vehicle. The basic shape of the vane is based upon the criteria that a line tangent to the curved surface at any point does not exceed an angle of 30° to the main airstream to avoid local separation.

4 Claims, 8 Drawing Figures

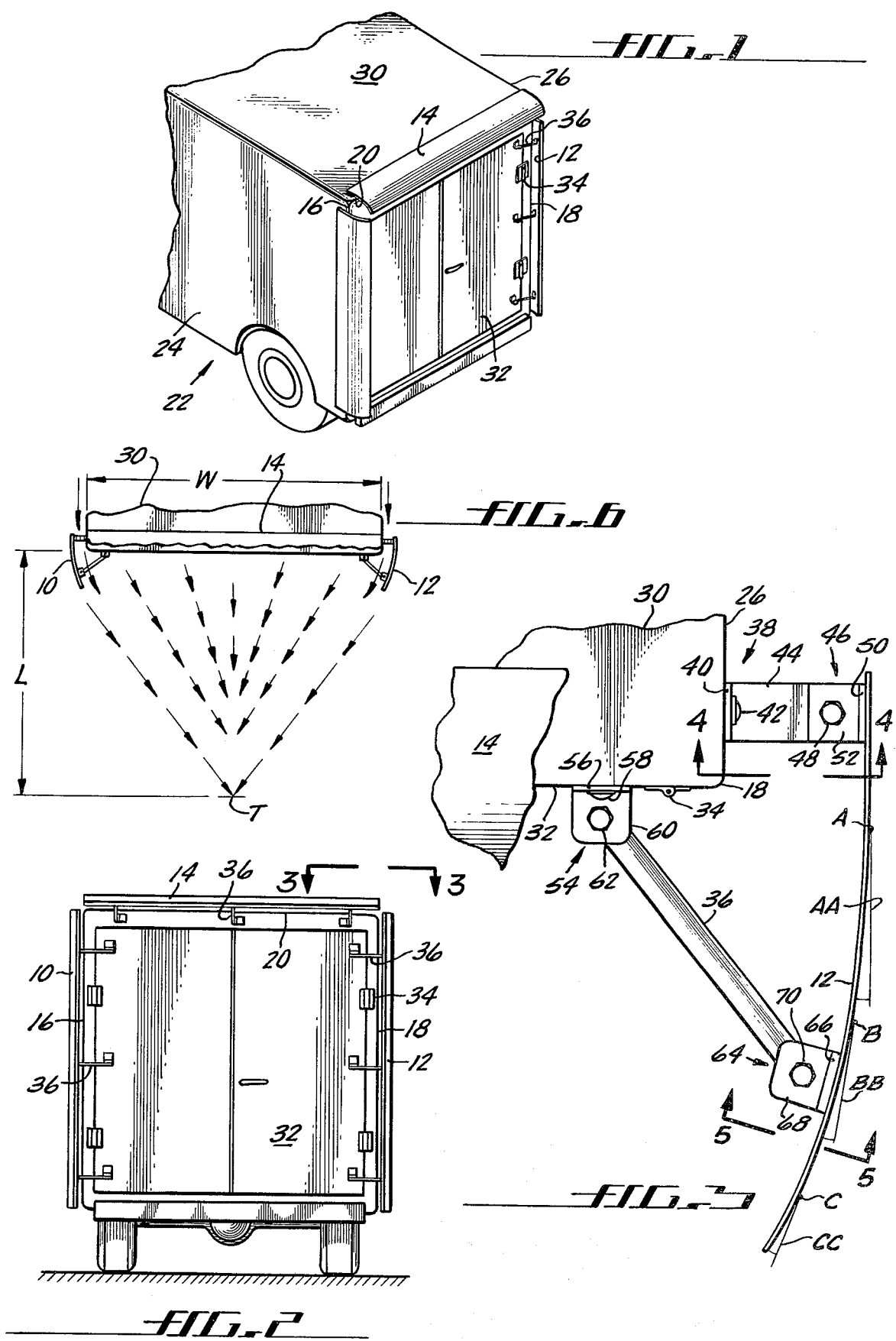

LEGEND
(FIG 7 AND FIG 8)
○ = TEST VEHICLE #1
□ = TEST VEHICLE #2
△ = TEST VEHICLE #3
△ʹ = TEST VEHICLE #3 IN TOWN

VEHICLE FLOW DIRECTION VANES

BACKGROUND OF PRESENT INVENTION

As fuel prices increase and as fuel supplies diminish, extended effort is made to increase the mileage performance of vehicles. Engine tune-ups and carburetor adjustments are obvious ways of increasing the number of miles per gallon of gas or diesel fuel that a vehicle will travel. Streamlining of the vehicle, whenever practical, is another way to increase gas mileage.

Streamlining an existing vehicle by changing its contour is both expensive and impractical. Also, in the case of transport vehicles, this would result in a reduction in the size of the payload, defeating the purpose of streamlining by increasing the cost per unit of cargo being transported.

Since large square-backed vehicles have a rearwardly extending pressure gradient which creates fuel consuming drag, and since streamlining of the vehicle is not practical, the use of vanes to deflect air flow behind the vehicle has been conceived by the present inventor as the solution to the problem of streamlining the air flow past the vehicle and thus reduce the effect of drag.

SUMMARY OF THE PRESENT INVENTION

In accordance with the present invention, fuel economy in vehicles of the flat-back type, such as campers, trailers, trucks and recreational vehicles, may be improved on the order of 20 percent by the use of vehicle flow direction vanes. These vanes have a 10 inch chord in which the first two inches from the leading edge is a straight surface and the balance of the chord is a curved surface. The basic shape of the vane is based on the criteria that a line tangent to the curved surface at any point would not exceed an angle of 30° to the main airstream to avoid local separation. In one form the vane is fabricated from 0.080 inch thick sheet material and, since it is subjected to a light load of only about 1.5 pounds per square foot, it may be made of a vacuum-formed plastic material. The leading edge is positioned about 2½ inches outwardly and about 2 inches forwardly of the rear corner edge of the vehicle. Brackets attach the vanes to the vehicle and permit pivotal movement when necessary for the opening of rear doors of the vehicle.

In addition to drag reduction, the attachment of vanes has also resulted in a definite improvement in vehicle stability and handling qualities. It also eliminates the interaction between passing vehicles which, for example, causes a passenger car to lurch sideways when passing a large truck.

BRIEF DESCRIPTION OF DRAWINGS

FIG. 1 is a perspective view of the rear end of a square-backed vehicle with vanes along the top and side edges, FIG. 2 is a view from the rear looking forwardly, FIG. 3 is an enlarged plan view taken along the line 3—3 of FIG. 2, FIG. 6 is a schematic illustration of freestream airflow resulting from the use of vanes.

DETAILED DESCRIPTION OF ILLUSTRATIVE EMBODIMENT

Figure 7:
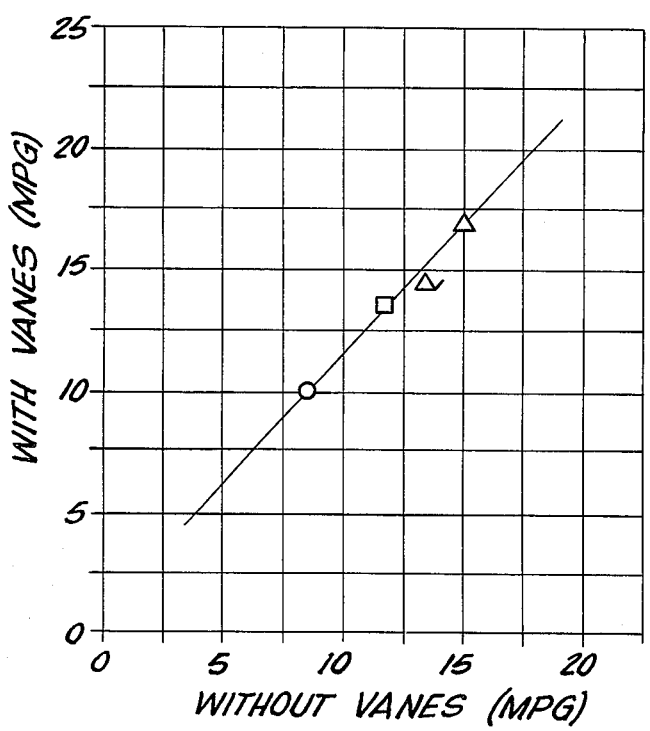
FIG. 7 is a graphic illustration showing a comparison of the gas mileage of test vehicles when using vanes and without vanes.

An illustrative embodiment of the present invention is shown in FIG. 1 wherein side vanes 10, 12 and top vane 14 are mounted to extend over edges 16, 18 and 20 respectively of truck 22. Edges 16 and 18 are vertical and join the side panels 24, 26 with the back 28. Edge 20 is horizontal and joins the roof 30 with the back. Back 28 has a door 32 mounted by hinges 34 along its vertical edge for swinging outwardly. Links 36 connect vane 12 to door 32. On vehicles not having doors hinged so close to the edge, the brackets may be attached to back surface.

A rear view of the truck, the vanes and their mountings can be seen in FIG. 2. Vanes 10 and 12 extend vertically the full height of the truck side edges 16, 18 and vane 14 extends across the width of top edge 20. Vanes 10 and 12 extend somewhat outwardly from edges 16, 18 and vane 14 extends somewhat upwardly from edge 20. An enlarged plan view of the configuration of vane 12 and its mounting is shown in FIG. 3.

Referring now to FIG. 3 there is shown in plan view the right rear corner of roof 30, side panel 26, and door 32. Top vane 14 is shown broken away for clarity. A plurality of T-shaped brackets 38 are mounted on side panel 26 near the edge 18. The arms 40 of the bracket 38 bear against the panel 26 and may be attached to it such as by means of screws or bolts 42. The leg 44 of bracket 38 extends out about 2 inches from the side of the panel 26 where it pivotally connects with bracket 46 by means of fastener 48. Bracket 46 consists of arms 50, bonded or welded to vane 12, with a pair of spaced legs 52 pivotally connecting with leg 44 through fastener 48.

Figure 4:
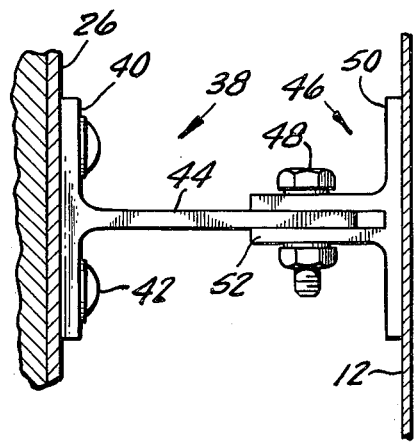
FIG. 4 is a sectional view taken along line 4—4 of FIG. 3.
Figure 5:
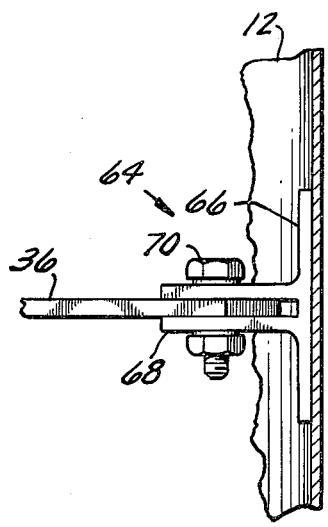
FIG. 5 is a sectional view taken along line 5—5 of FIG. 3.

Links 36 connect the rear portion of vane 12 with the back of the vehicle, in this case with rear door 32. Mounted on door 32 are mounting brackets 54 which consist of arms 56 which bear against door 32 and are attached to it such as by means of screws or bolts 58. A pair of spaced legs 60 extend outwardly to receive one end of link 36 in between. Fastener 62 passes through legs 60 and link 36 for pivotal interconnection. A similar mounting bracket 64 consisting of arms 66 and spaced legs 68 is attached to the rear portion of vane 12. The legs 68 are pivotally connected to link 36 by means of fastener 70. Elevational views of brackets 38, 46 and 64 are shown in FIGS. 4 and 5 to enhance a better understanding of their construction and function.

As can be seen in FIG. 3, when door 32 pivots on hinges 34 to its open position, link 36 moves the rear portion of vane 12 out of the way. Vane 12 pivots about fastener 48 which connects brackets 38 and 46 together.

While wind deflectors for the rear end of vehicles have been used for the purpose of directing an air flow across the back of the vehicle to keep it clean, and hence its shape and angular positioning have been for this purpose, the configuration and positioning of the vanes in conformance with the present invention are different and are for a different purpose. Typically the chord or width of the vane is about 10 inches, with the leading edge of about 2 inches being straight and substantially parallel to the sides of the vehicle on which it is mounted. Thereafter in the fore to aft direction the remaining 8 inches of vane 12 curves progressively inwardly. A line tangent to the curved surface at any point must be 30° or less to the main fore and aft airstream. However, the angles become progressively larger in the fore to aft direction. For example, at point A the freestream air flow is along line AA and the angle 12-AA between this line and the vane at that point is approximately 5°. At point B the free-stream air flow is no longer parallel to the vehicle side but is in the direction of line BB. Vane 12 curves inwardly at this point, forming angle 12-BB of about the same 5° relative to this line. However, this is approximately 10° to line AA. Similarly, at point C the freestream air flow is in the direction of line CC. Again, the vane 12 curves inwardly at this point, forming an angle 12-CC of about 5° relative to this line. However, the maximum angle between the outer surface and the main fore to aft airstream cannot exceed 30°. Otherwise air separation occurs.

Tip separation occurs without regard to air flow velocity (vehicle speed) when these angles exceed 30°. Also induced drag from "lift" from the high side or convex side of the curved panel is created and reduces the efficiency when the angle is excessive.

In FIG. 6 there is shown a schematic illustration of freestream airflow resulting from the use of vanes in accordance with the present invention. Suppose, without vanes, the vehicle were 15 ft. long and 6 ft. wide. This would provide a fineness ratio of 15/6 = 2½/1. However, if a 15 ft. streamlined cone could be added, the effective length would be 30 ft. and the effective fineness ratio then would be 30/6 = 5/1. By using vanes 12 an artificial cone of high speed is created. This cone has a tip T of length L extending rearwardly from the vehicle. When this high velocity cone is created, air from the airstream past the moving vehicle is prevented from turning in and penetrating the cone. The results of this artificial streamlined cone is shown in FIGS. 7 and 8.

Figure 8:
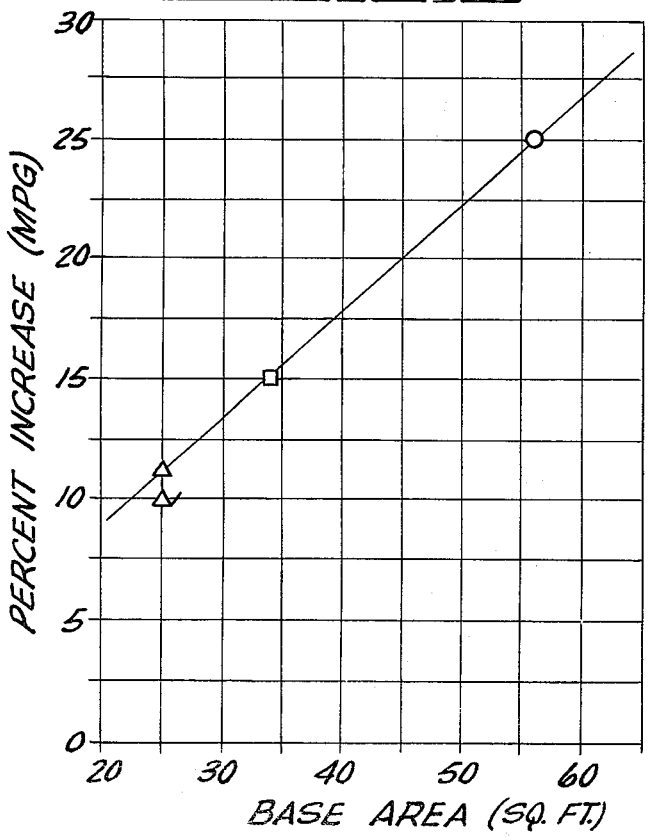
FIG. 8 is a graphic illustration showing the relationship between the base area of the back surface of a vehicle and its increased performance when using the vanes.

In FIG. 7 a comparison is shown of several test vehicles with and without vanes. Test vehicle No. 1 had an 8 miles per gallon (MPG) average without vanes and 10 MPG average with vanes, for a 25% increase in mileage performance. Test vehicle No. 2 increased its mileage performance from 12 to 13.8 MPG when vanes were added.

This is an increase of approximately 15%.

Test vehicle No. 3 increased its mileage from 15 to 16.7 MPG with vanes for a 12% increase. When test vehicle No. 3 was used in city stop and go traffic its gas mileage increased from 13 to 14.3 for a 10% increase.

The relationship of the percentage increase in mileage with base area (area of vehicle back surface) is shown in FIG. 8. Test vehicle No. 1 with a 56 square foot back surface showed a 25% mileage increase. Test vehicle No. 2 with a 34 square foot back surface showed a 15% mileage increase. Test vehicle No. 3 with a 25 square foot back surface showed a 12% increase in mileage. In city traffic its increase was 10%. It can be seen that with the larger back surface (and thus a greater drag), the percentage of gas mileage increase is higher when vanes are used.

Having thus described an illustrative embodiment, it is to be understood that various modifications will occur to those skilled in the art and such variations from the embodiment described herein is to be considered as a part of this invention as set forth in the appended claims.

What is claimed is:

1. A vehicle flow direction vane for mounting onto rear side-to-back corners of vehicles having large substantially flat rear surfaces creating drag behind moving vehicles,
    said vane having a leading edge and a trailing edge,
    brackets on said vane for attaching to the side surface of said vehicle to maintain said leading edge spaced from said side surface,
    brackets on said vane for attaching to the rear surface of said vehicle to maintain said trailing edge within 30° of a line extending rearwardly from said leading edge said vane having a vane surface extending from said leading edge straight and parallel to the main airstream for about 20% of the vane chord, said vane surface thereafter progressively curving inwardly as it extends rearwardly of said leading edge up to and not exceeding a 30° curvature of said vane surface relative to the main airstream.

2. A vehicle flow direction vane as set forth in claim 1 wherein lines tangent to the vane surface at any point does not exceed an angle of 30° to the main airstream and wherein said lines form progressively larger angles when tangent to said vane surface at points spaced in a fore to aft direction.

3. A vehicle flow direction vane as set forth in claim 1 wherein said brackets pivotally connect said vane to said vehicle thus permitting a back door to pivot open without interference from said vane.

4. A vehicle flow direction vane as set forth in claim 1 in combination with a similar vane along the other rear side-to-back corner for increasing the fineness ratio of said vehicle by creating a high velocity cone rearwardly of said vehicle and thus increasing its streamlined effect and gas consumption efficiency.

* * * * *